United States Patent
Sousa

(10) Patent No.: US 6,210,864 B1
(45) Date of Patent: Apr. 3, 2001

(54) METHOD AND APPARATUS FOR LASER IMAGING WITH MULTI-MODE DEVICES AND OPTICAL DIFFUSERS

(75) Inventor: John Gary Sousa, Hudson, NH (US)

(73) Assignee: Presstek, Inc., Hudson, NH (US)

( * ) Notice: Subject to any disclaimer, the term of this patent is extended or adjusted under 35 U.S.C. 154(b) by 0 days.

(21) Appl. No.: 09/167,125

(22) Filed: Oct. 6, 1998

(51) Int. Cl.$^7$ .................... G03F 7/207; G02B 17/00; G02B 3/08
(52) U.S. Cl. .................................. 430/302; 359/737
(58) Field of Search ....................... 430/302; 359/737

(56) References Cited

U.S. PATENT DOCUMENTS

| | | | |
|---|---|---|---|
| 3,284,722 | 11/1966 | Gray ........................ | 331/94.5 |
| 3,302,016 | 1/1967 | Larraburu ................... | 240/41.3 |
| 3,467,099 | 9/1969 | Lotmar ....................... | 128/303.1 |
| 3,670,260 | 6/1972 | Koester et al. ............. | 331/94.5 |
| 3,920,951 | 11/1975 | Chovan et al. ............. | 219/121 L |
| 4,185,891 | 1/1980 | Kaestner ..................... | 350/167 |
| 4,440,470 | 4/1984 | Khoe ........................... | 350/96 |
| 4,530,574 | 7/1985 | Seifres et al. ............... | 350/420 |
| 4,653,056 | 3/1987 | Baer et al. ................... | 372/27 |
| 4,665,529 | 5/1987 | Baer et al. ................... | 372/107 |
| 4,707,073 | 11/1987 | Kocher ........................ | 350/96.23 |
| 4,710,940 | 12/1987 | Sipes, Jr. .................... | 372/75 |
| 4,739,507 | 4/1988 | Byer et al. ................... | 372/22 |
| 4,791,631 | 12/1988 | Baumert et al. ............. | 372/22 |
| 4,809,291 | 2/1989 | Byer et al. ................... | 372/75 |
| 4,812,005 | 3/1989 | Heywang ..................... | 350/96.2 |
| 4,822,987 | 4/1989 | Goldenfield et al. ........ | 235/462 |
| 4,847,851 | 7/1989 | Dixon .......................... | 372/75 |
| 4,865,409 | 9/1989 | Althaus et al. .............. | 350/96.18 |
| 4,872,177 | 10/1989 | Baer et al. .................... | 372/75 |
| 4,890,289 | 12/1989 | Basu et al. ................... | 372/33 |
| 4,910,737 | 3/1990 | Payne et al. ................. | 372/6 |
| 4,942,582 | 7/1990 | Kintz et al. .................. | 372/18 |
| 4,945,544 | 7/1990 | Tanaka et al. ............... | 372/70 |
| 4,955,725 | 9/1990 | Johnson et al. .............. | 372/22 |
| 4,979,791 | 12/1990 | Bowen et al. ................ | 350/96.17 |
| 5,058,118 | 10/1991 | Qui et al. ..................... | 372/21 |
| 5,127,068 | 6/1992 | Baer et al. .................... | 385/34 |
| 5,130,996 | 7/1992 | Amano et al. ............... | 372/21 |
| 5,186,995 | 2/1993 | Yoshizawa et al. .......... | 428/64 |
| 5,196,866 | 3/1993 | Ferschl et al. ............... | 346/108 |
| 5,197,072 | 3/1993 | Harada et al. ................ | 372/21 |
| 5,216,681 | 6/1993 | St. Pierre et al. ........... | 372/22 |
| 5,222,088 | 6/1993 | Amano ......................... | 372/22 |
| 5,245,618 | 9/1993 | Masuda et al. ............... | 372/22 |
| 5,250,961 | 10/1993 | Yamanaka et al. ........... | 346/108 |
| 5,268,978 | 12/1993 | Po et al. ....................... | 385/33 |
| 5,278,851 | 1/1994 | Goto ............................. | 372/19 |
| 5,291,505 | 3/1994 | Nielsen ......................... | 372/38 |
| 5,303,250 | 4/1994 | Masuda et al. ............... | 372/38 |
| 5,327,338 | 7/1994 | Allen et al. ................... | 346/108 |
| 5,331,650 | 7/1994 | Maeda et al. ................. | 372/26 |
| 5,351,617 | 10/1994 | Williams et al. ............. | 101/467 |
| 5,410,559 | 4/1995 | Nighan, Jr. et al. .......... | 372/19 |
| 5,450,244 | 9/1995 | Fantone ........................ | 359/710 |
| 5,504,515 | 4/1996 | Zertani et al. ................ | 347/235 |
| 5,534,386 | 7/1996 | Petersen et al. .............. | 430/320 |
| 5,561,547 | 10/1996 | Keirstead et al. ............ | 359/288 |
| 5,664,251 | 9/1997 | Tachihara et al. ............ | 396/548 |
| 5,764,274 | 6/1998 | Sousa et al. .................. | 347/258 |
| 5,783,364 | 7/1998 | Ellis et al. .................... | 430/302 |

FOREIGN PATENT DOCUMENTS

| | | | |
|---|---|---|---|
| 0601485A2 | 6/1994 | (EP) ............... | B41J/2/455 |
| 0790517A | 8/1997 | (EP) . | |
| H10-76385 | 3/1998 | (JP) . | |

OTHER PUBLICATIONS

"Yttrium Orthovanadate (YVO4)".
Longhi, *J. Opt. Soc. Am B.*, 11:1098–1107 (1994).
Zhou et al., *Optics Letters*, 18:511–512 (1993).
Robrish, *Optics Letters*, 19:813–815 (1994).

*Primary Examiner*—Cynthia Hamilton
(74) *Attorney, Agent, or Firm*—Testa, Hurwitz & Thibeault LLP

(57) ABSTRACT

Multi-mode laser radiation is focused to a preselected spot size on a recording construction using a controlled-angle diffuser. The diffuser concentrates the radiation, counteracting the dispersive effects of multi-mode output.

5 Claims, 2 Drawing Sheets

METHOD AND APPARATUS FOR LASER IMAGING WITH MULTI-MODE DEVICES AND OPTICAL DIFFUSERS

BACKGROUND OF THE INVENTION

1. Field of the Invention

The present invention relates to digital printing apparatus and methods, and more particularly to a system for imaging of recording media such as lithographic printing members.

2. Description of the Related Art

Imaging devices that utilize laser power sources require delivery of the laser output to a working surface of the recording medium. It is important, when focusing radiation onto the recording blank, to maintain satisfactory depth-of-focus—that is, a tolerable deviation from perfect focus on the recording surface. Adequate depth-of-focus is important to construction and use of the imaging apparatus; the smaller the working depth-of-focus, the greater will be the need for fine mechanical adjustments and vulnerability to performance degradation due to the alignment shifts that can accompany normal use. Depth-of-focus depends on numerous factors, including the characteristics of the laser itself, its output beam divergence, and the optical arrangement used to transport the laser output and focus it.

An ideal laser emits "single-mode" radiation—that is, a beam having a radially symmetric Gaussian energy distribution.

The bulk of the beam's energy is concentrated in a single, central peak, and falls off radially and smoothly in all directions according to the Gaussian function. Single-mode radiation not only enhances depth-of-focus, but also produces clean image dots with crisp, circular outline contours.

Unfortunately, not all recording constructions are imaged at wavelengths for which single-mode lasers are available. Instead, the imaging lasers produce beam profiles having uneven intensities. The beams are "multi-mode," exhibiting several (or numerous) intensity peaks rather than a single dominant peak. The dots they produce on a recording construction have multiple "hot spots" rather than a single, central region of maximum imaging intensity.

In graphic-arts applications, such as imaging of lithographic printing plates, these uneven image dots can prove highly disadvantageous. The cumulative effect of ragged image dots is a general degradation of image quality. Moreover, the sharp multi-mode peaks reduce depth-of-focus, since deviation from ideal focus causes their energy flux densities to fall off far more rapidly than would be the case with single-mode peaks.

DESCRIPTION OF THE INVENTION

BRIEF SUMMARY OF THE INVENTION

The present invention utilizes a controlled-angle diffuser to counteract the dispersive effects of multi-mode output. Controlled-angle diffusers are typically used to scatter transmitted light into a precisely controlled annular region. It has been found, however, that the concentrating effect of these devices, particularly at low dispersion angles, has the effect of drawing a multi-mode output into a more uniform profile that approaches single-mode operation. So long as the energy dispersion is sufficiently controlled, the practical effect in an imaging environment is acceptable; that is, the output will create a relatively uniform image spot with a strong central region (and minimal surrounding "hot spots").

Accordingly, in a first aspect, the invention comprises an apparatus for focusing multi-mode laser radiation to a preselected spot size on a recording construction. The apparatus comprises a controlled-angle diffuser, means for directing the multi-mode radiation through the diffuser so as to concentrate the radiation, and means for focusing concentrated radiation emerging from the diffuser onto the recording construction. The construction may, for example, be mounted on a rotary drum, with the laser output scanning the construction in an axial series of circumferential imaging columns or "swaths."

In a second aspect, the invention comprises methods for implementing the invention and imaging therewith.

BRIEF DESCRIPTION OF THE DRAWINGS

The foregoing discussion will be understood more readily from the following detailed description of the invention, when taken in conjunction with the accompanying drawings, in which.

DETAILED DESCRIPTION OF THE PREFERRED EMBODIMENTS

A representative imaging envirnonment in which the present invention may operate is disclosed in, for example, U.S. Pat. Nos. 5,351,617, 5,385,092, and 5,764,274, the entire disclosures of which are hereby incorporated by reference. As discussed in the '617 and '092 patents, laser output can be generated remotely and brought to the printing blank by means of optical fibers and focusing lens assemblies. Alternatively, the laser diode itself can be positioned adjacent the printing member and its output provided directly thereto through a focusing assembly.

Figure 1:
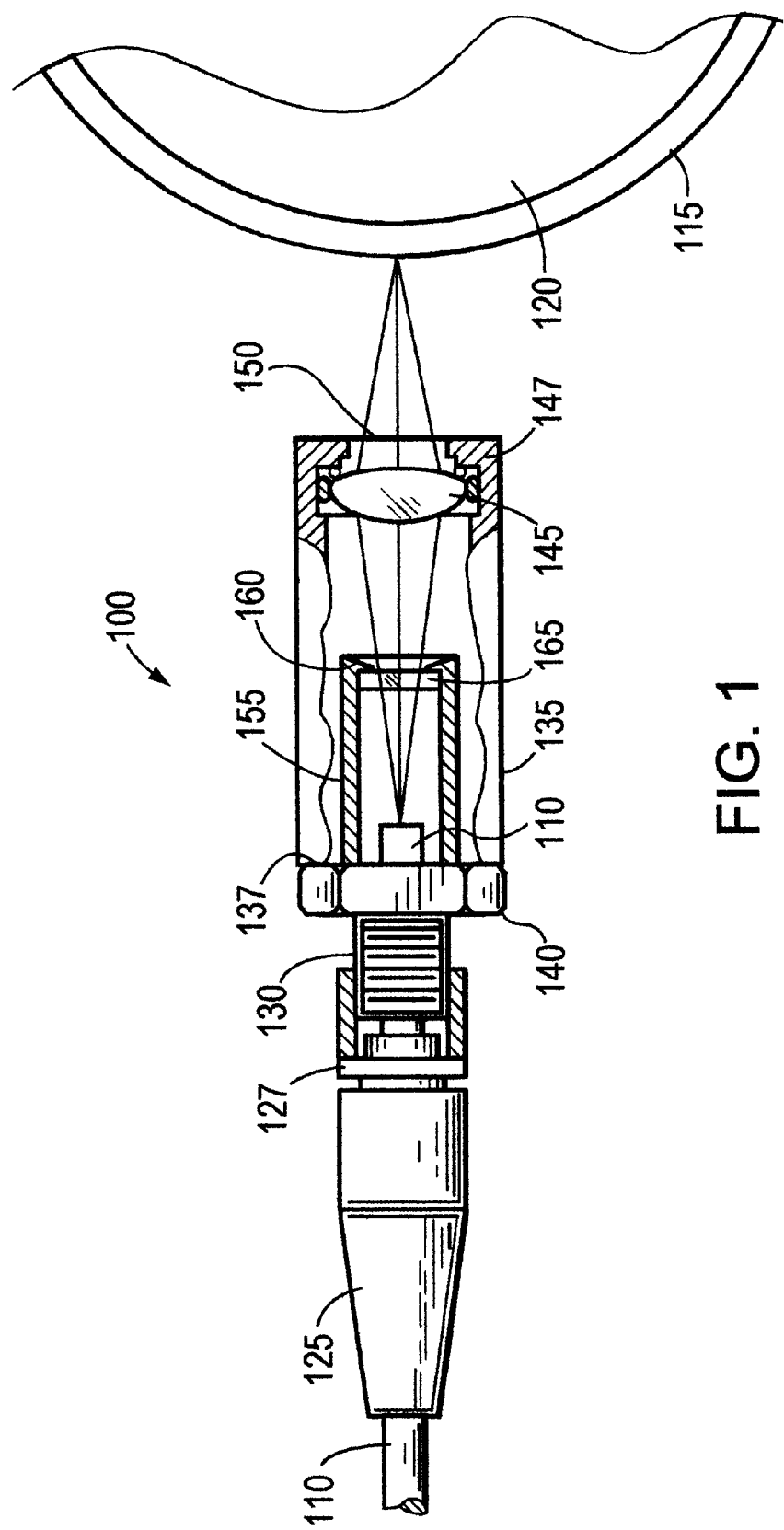
FIG. 1 is a partial cutaway elevation of a focusing arrangement in accordance with the present invention.

An output assembly in accordance with the present invention guides laser radiation (taken directly from the laser itself, or from a fiber-optic cable) to an imaging surface—for example, the ablation layer of a thermally imaged lithographic printing plate. In the representative configuration shown in FIG. 1, an output assembly 100 receives radiation from a fiber-optic cable 110 to the imaging surface of a printing member 115, which is itself supported on a rotatable drum or plate cylinder 120. (Numerous alternatives to this configuration are possible. For example, printing member 115 can constitute the exterior surface of drum 120, or, as noted in the '617 patent, printing member 115 can be supported on the interior of a curved platen, or on a flatbed arrangement.)

As shown in the figure, fiber-optic cable 110 terminates in an SMA connector assembly 125, which includes a threaded collar 127 that mates with a sleeve 130 on the assembly 100. In addition to sleeve 130, output assembly 100 includes a tubular housing 135. Sleeve 130 is secured to the end wall 137 of housing 135 by a nut 140. A focusing and correction lens 145 (in accordance, for example, with the '274 patent), is housed within a retaining cap 147 that is itself fastened to the posterior end of housing 135. Cap 147 includes a window 150 that exposes lens 145, and which may have a diameter less than that of housing 135.

Assembly 100 includes a pair of concentric interior bores that define a light path from the end of fiber 110, where laser radiation is emitted, to lens 145. The first of these passes through a tube 155 joined to the inner face of rear wall 137 opposite sleeve 130, such that the end of fiber 110 protrudes into tube 155 when collar 127 mates with sleeve 130. The end of tube 155 defines a baffle 160 that imposes a fixed radial extent by which emitted radiation can diverge from the central propagated ray, thereby preventing passage of radiation having numerical aperture (NA) values above a predetermined limit. (As described in the '274 patent, small NA values correspond to desirably large depths-of-focus.) Baffle 160 has a sharp, flared edge to avoid reflections. In the illustrated embodiment, the edge of baffle 160 is a conically flared bezel. An optical diffuser 165 in accordance with the invention is set within tube 155 immediately adjacent baffle 160.

The second bore of assembly 100 is defined by the interior wall of housing 135. Low-NA laser radiation emerging from tube 155 passes through the interior of housing 135 and strikes lens 145, which focuses the radiation and may correct for off-center emission. Baffle 160 restricts the divergence of radiation sufficiently to avoid reflections from the interior wall of housing 135, and window 150 forms an aperture stop that restricts the ultimate output to low-NA radiation. Although energy is lost each time radiation is restricted, adjustment of the diameter of window 150 allows depth-of-focus to be maximized; the diameter can be varied simply by maintaining an inventory of end caps having differently sized apertures and utilizing the aperture most appropriate to the laser that will be employed.

All surfaces of tube 155 and the interior surface of housing 135 are blackened (e.g., with Ebnol "C" black) to prevent reflection.

Preferably, diffuser 165 is a controlled-angle diffuser, available from such suppliers as Digital Optics Corporation, Charlotte, N.C. These optical devices concentrate incident radiation within a defined angular output region having a cross-section of desired shape—typically a square or circle—whose size increases with distance in accordance with the diffusion angle of the device. For present purposes, this angle is selected based on the nature of the multi-mode laser source and the degree of beam concentration required; however, the dispersion angle must also be matched to the optical characteristics of assembly 100 to present a spot of desired size onto printing member 115. It has been found that, for implementations such as that illustrated in FIG. 1, a beam-diffusion angle of 3° and circular shape provides satisfactory performance.

Figure 2:
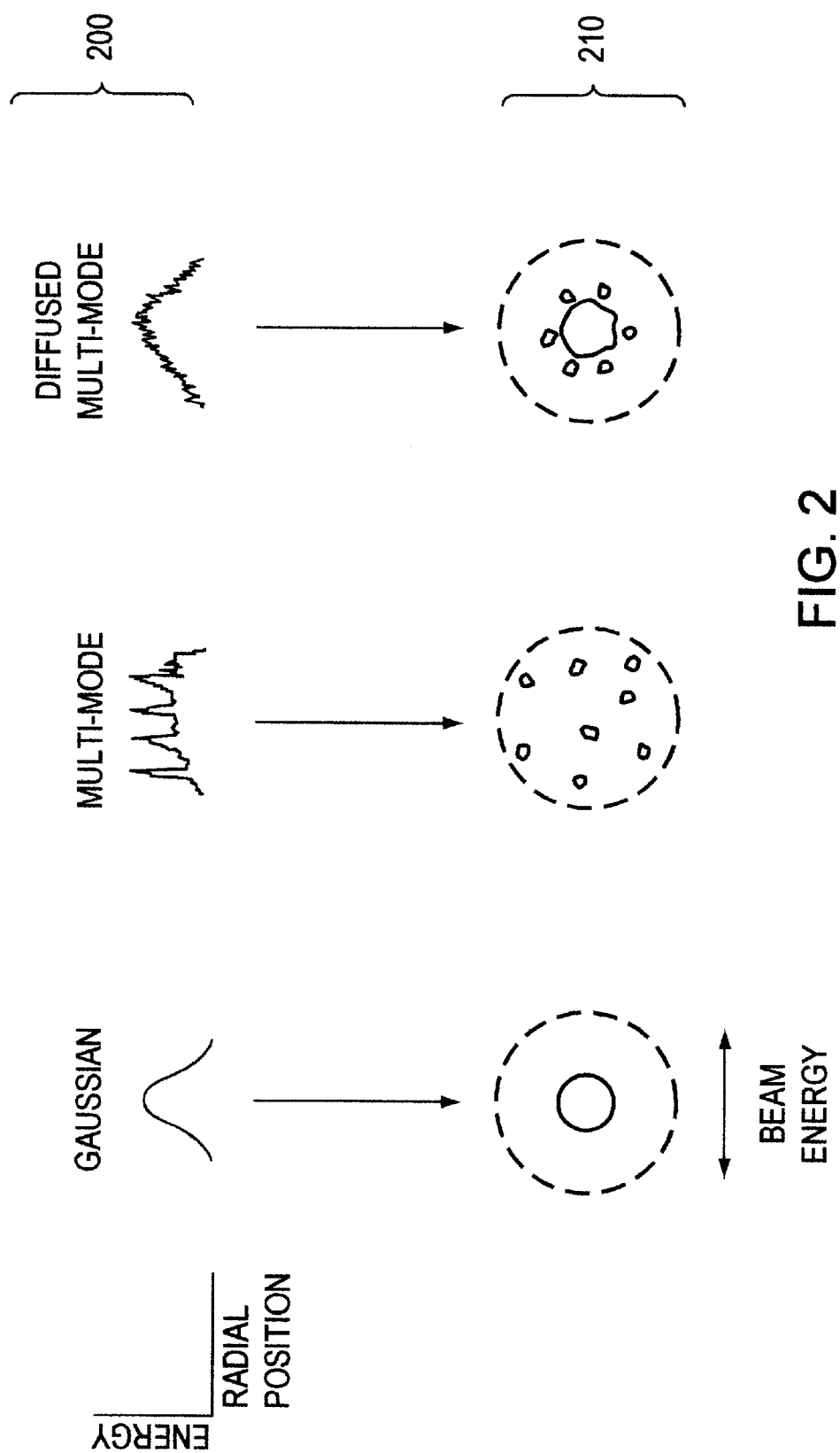
FIG. 2 graphically illustrates the effect of a controlled-angle diffuser on multi-mode laser output.

The correction achieved by optical diffuser 165 is illustrated in FIG. 2. For each of three types of sources—a single-mode laser, an unmodified multi-mode laser, and a multi-mode laser whose output is passed through a controlled-angle diffuser—a plot 200 illustrates the energy amplitude of a radial beam cross-section, and a representation 210 shows the imaging spot produced by such a beam (corresponding to a plan view of the response of a recording construction to the energy distribution indicated at 200). It should be stressed that FIG. 2 is intended to serve an illustrative purpose, and does not purport to depict exact energy profiles or image spots.

Because the single-mode beam has a Gaussian profile 200, it reliably produces an image dot 210 with a well-defined round contour. The edge uniformity of the dot 210 is best achieved with a recording medium that undergoes a sharp, nonlinear imaging transition—that is, which remains unimaged until the incident energy reaches a threshold level, at which point it suddenly becomes fully imaged. Thus, the diameter of the dot 210 is defined by the portion of the beam whose energy lies at or above the threshold; the entire area of the beam (i.e., the energy above noise level) is indicated by the dashed circle.

The multi-mode beam exhibits an energy profile that varies over the beam cross-section (and which is typically radially asymmetric—i.e., rising in peaks that are scattered over the cross-section rather than defining concentric rings). Thus, the particular radial cross-section 200 of the multi-mode beam shows four sharp peaks, and the resulting image dot is really a desultory series of specks that reflect energy peaks rising above the imaging threshold; the four collinear image specks arise from the four peaks shown in the beam energy profile.

Passing the multi-mode beam through a controlled-angle diffuser causes the scattered energy to be concentrated toward a central radial region, resulting in a beam energy profile which, while not smoothly Gaussian, is nonetheless roughly so in contour. Essentially, numerous intensity peaks are reduced in individual height and the overall intensity distribution becomes centrally weighted. Accordingly, the resulting image dot is largely, if not perfectly round; and although the dot is surrounded by several image specks (which result from outlying energy peaks rising above the imaging threshold), these are not problematic from a graphic-arts perspective so long as the central dot dominates and is sufficiently small. In typical applications, image dots are too small to be perceived individually. Accordingly, while the eye will perceive a neighborhood of image spots produced by the multi-mode device as an indistinct blur, the perception of the diffused image dot will be similar to that of the single-mode dot.

It will therefore be seen that I have developed an easily implemented and highly effective approach to imaging using multi-mode devices. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. Printing apparatus comprising:
   a. means for supporting a laser-imageable printing member;
   b. at least one laser source capable of producing a multi-mode imaging output;
   c. means for conveying the output of the at least one laser source directly to the printing member, said means comprising:
      1) a controlled-angle diffuser;
      2) means for directing the multi-mode output through the diffuser so as to concentrate the output; and
      3) means for focusing concentrated radiation emerging from the diffuser onto the recording construction.

2. A method of focusing multi-mode laser output to a preselected spot size on a recording construction, the method comprising the steps of:
   a. directing the multi-mode output through a controlled angle diffuser so as to concentrate the output; and
   c. focusing concentrated radiation emerging from the diffuser onto the recording construction.

3. The method of claim 2 further comprising the step of scanning the output over a recording construction and activating the laser in an imagewise pattern.

4. The method of claim 2 wherein the diffuser has a circular diffusion angle of 3°.

5. A method of imaging a lithographic printing member, the method comprising the steps of:
   a. providing a laser-imageable printing member;

b. providing at least one laser source capable of producing a multi-mode imaging output;
c. conveying the output of the at least one laser source directly to the printing member by:
   1) directing the output through a controlled-angle diffuser so as to concentrate the output;
   2) focusing concentrated radiation emerging from the diffuser onto the recording construction;
d. causing relative movement between the at least one laser source and the printing member to effect a scan of the printing member; and
e. activating the at least one laser source in an imagewise pattern during the scan.

* * * * *